June 19, 1951     G. W. SCHATZMAN     2,557,145
FENDER AND FENDER SHIELD STRUCTURE AND
ATTACHING MEANS THEREFOR
Filed Nov. 8, 1946     4 Sheets—Sheet 1
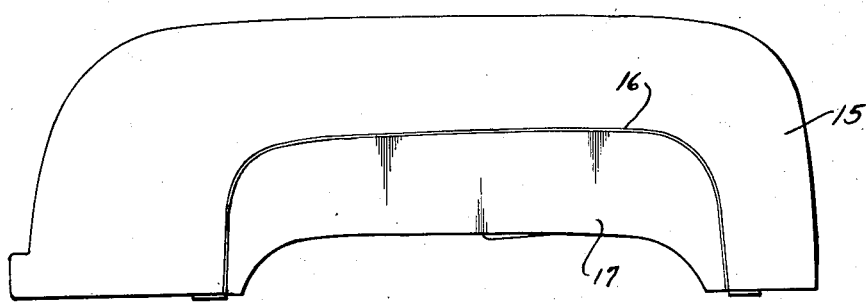
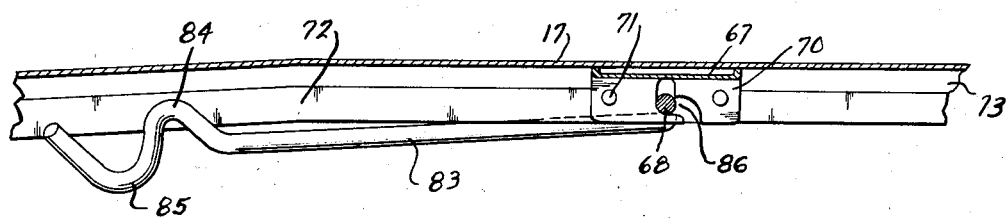
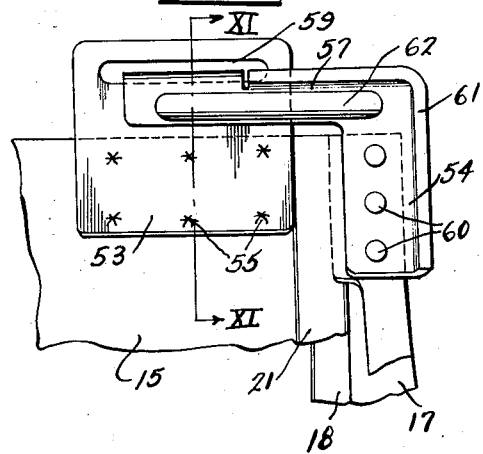
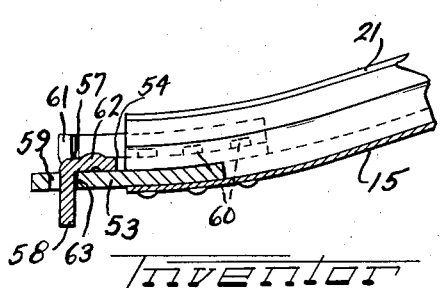
Inventor
George W. Schatzman
by The Firm of Charles W. Hills Attys

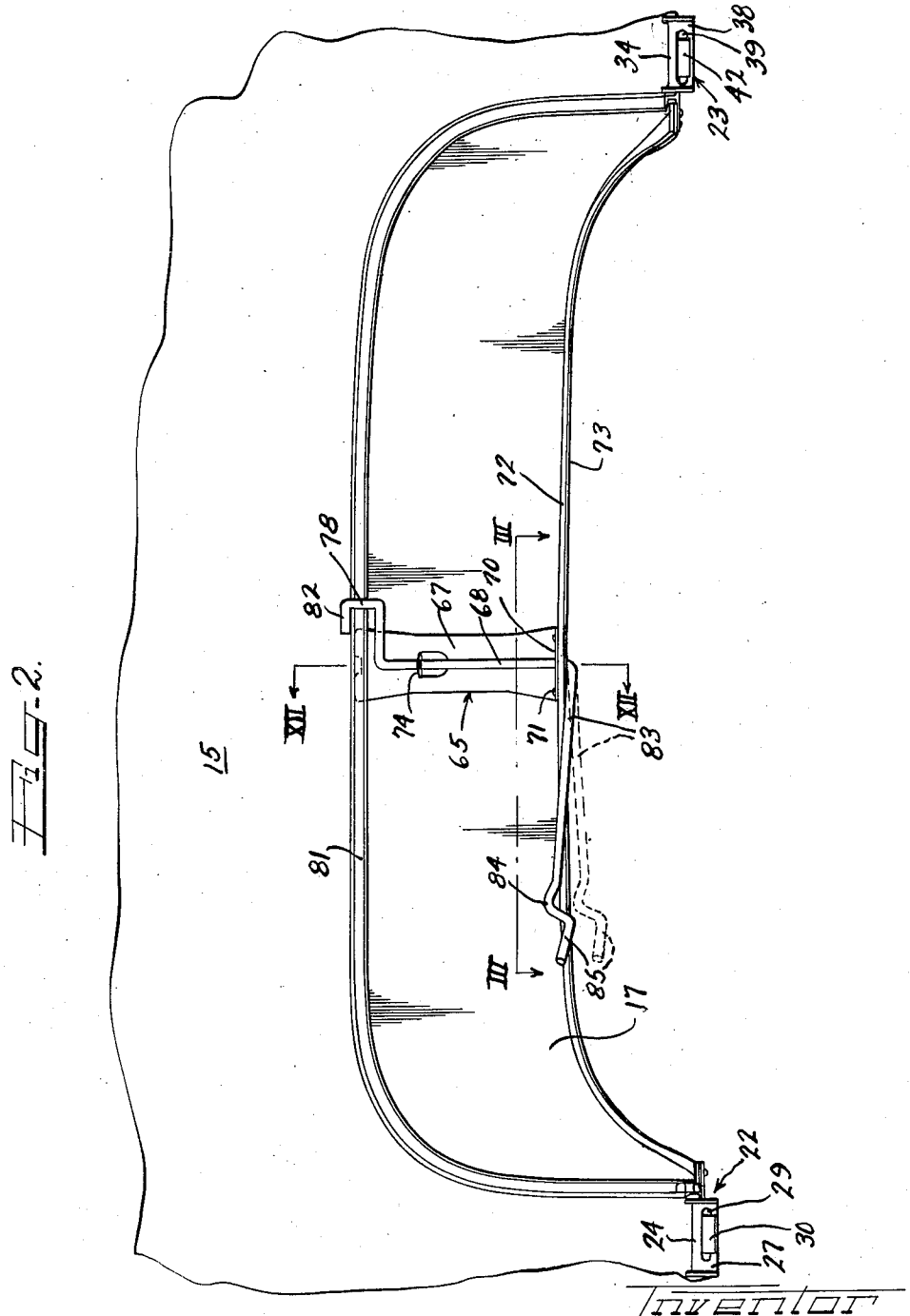

June 19, 1951  G. W. SCHATZMAN  2,557,145
FENDER AND FENDER SHIELD STRUCTURE AND
ATTACHING MEANS THEREFOR Filed Nov. 8, 1946  4 Sheets-Sheet 3

Inventor
GEORGE W. SCHATZMAN
by The Firm of Charles Hill Attys

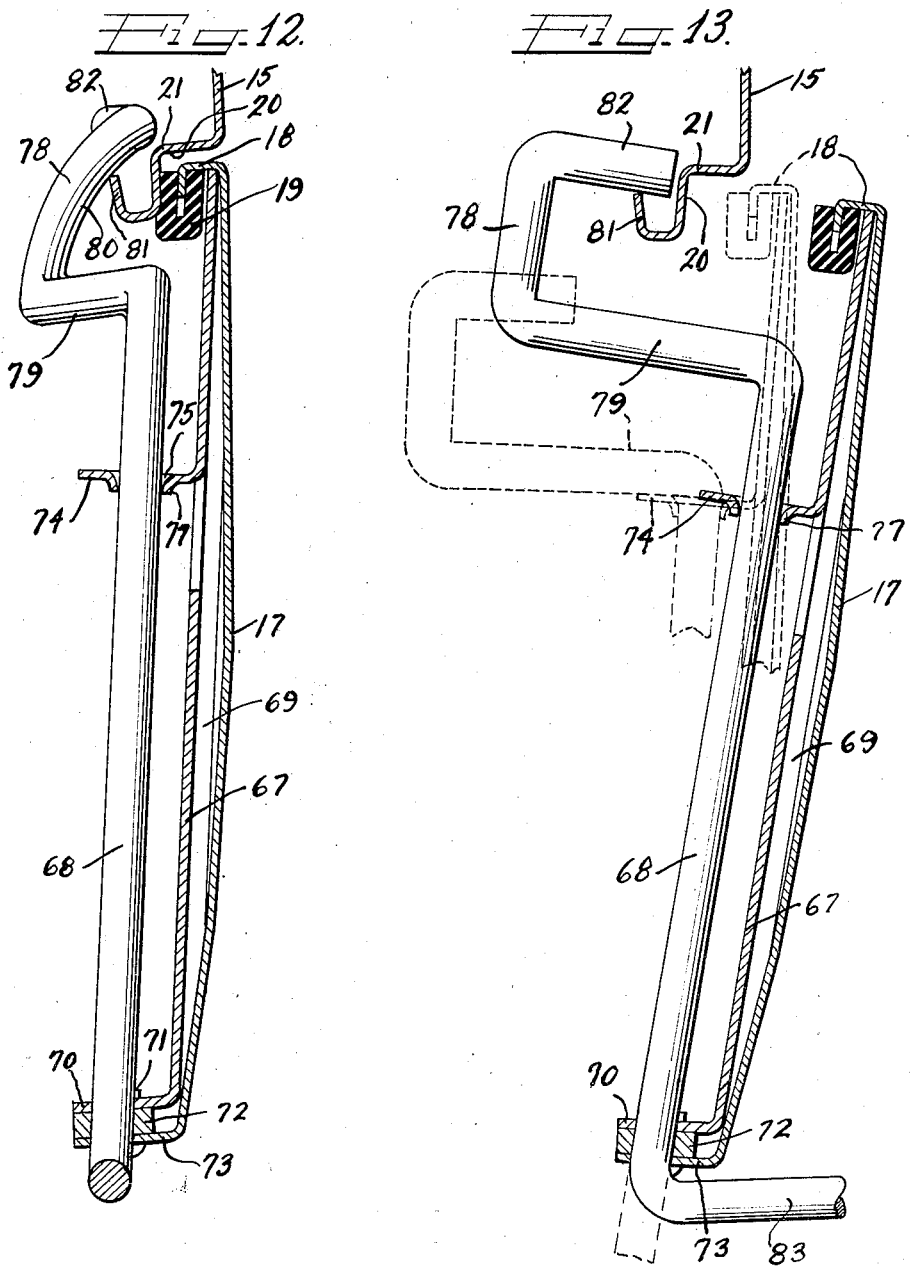

Patented June 19, 1951

2,557,145

UNITED STATES PATENT OFFICE 2,557,145

FENDER AND FENDER SHIELD STRUCTURE AND ATTACHING MEANS THEREFOR

George W. Schatzman, Detroit, Mich., assignor to Houdaille-Hershey Corporation, Detroit, Mich., a corporation of Michigan Application November 8, 1946, Serial No. 708,512

19 Claims. (Cl. 280—153)

This invention relates to fender and fender skirt or shield construction, and more particularly to novel structural means and relationships for mounting the fender shield in assembly with the fender.

In the vehicle industry, and particularly in the automobile industry, various means have been utilized to improve the appearance of vehicle fenders. The usual vehicle fender is provided with an opening which affords access to the vehicle wheel, and which permits the ready removal or replacement of the wheel in an axial direction. Since this opening inherently presents an unattractive outward appearance, detachable fender shields have been employed for covering the opening ornamentally.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" will hereinafter be employed, it refers to any form of wheel fender in its broad sense, whether such fender is separated from the vehicle body part, partly separated from the vehicle body part, or actually is an integral part of the vehicle body, and whether or not it projects outwardly away from the principal body portion of the vehicle.

An important object of the present invention is to provide a novel fender and fender shield assembly in which the fender shield is mounted in assembly with the fender in a novel manner.

Another object of the invention is to provide a novel fender shield construction which is economical to manufacture, which is rugged and reliable in use, and in which the fender shield is readily and quickly attached to and detached from the vehicle fender.

A further object of the invention is to provide a fender and fender shield assembly including a novel means for easily and quickly mounting or demounting the fender shield.

Still another object of the invention is to provide a novel mechanism for detachably securing a fender shield to a fender.

Yet another object of the invention is to provide a novel fender and fender shield assembly wherein the assembly includes a novel means for attaching the lower margin of the fender shield in an improved manner as a preliminary to mounting it into full engagement with the fender.

A still further object of the invention is to provide improved means for supporting the opposite ends of a fender shield in assembly with a fender for rocking of the fender shield about a substantially horizontal axis, such means being of an unusually economical and efficient, fool-proof construction.

Other objects, features and advantages of the present invention will become readily apparent from the following detailed description of certain preferred embodiments thereof taken in conjunction with the accompanying four sheets of drawings in which:

Figure 1 is an outside elevational view of a fender and fender shield assembly;

Figure 2 is a fragmentary inside elevational view of the fender shield and contiguous portion of the fender on a substantially enlarged scale;

Figure 3 is a fragmentary horizontal sectional detail view on a somewhat larger scale taken substantially along the line III—III of Figure 2;

Figure 10 is a fragmentary top plan view showing a further modified form of fender shield supporting and attaching means;

Figure 11 is a fragmentary vertical sectional view taken along the line XI—XI of Figure 10;

Figure 12 is an enlarged vertical sectional detail view taken substantially along the line XII—XII of Figure 2; and Figure 13 is a vertical sectional view taken in the same plane as Figure 12 but showing the component parts of the fender and fender shield assembly and latching mechanism in different positions assumed during assembly or disassembly of the fender shield.

On the drawings:

Figure 4:
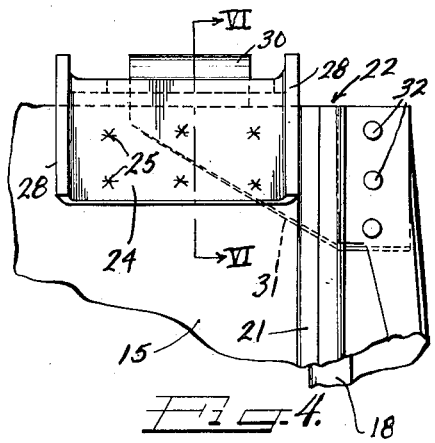
Figure 4 is an enlarged fragmentary top plan view of the fender shield supporting and attaching means at one end of the fender shield.
Figure 5:
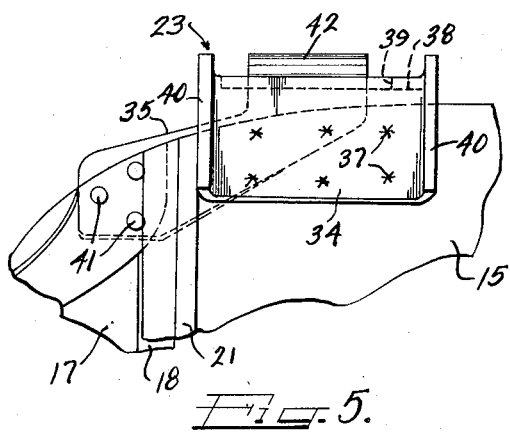
Figure 5 is a fragmentary top plan view showing the attaching and supporting means at the opposite end of the fender shield.
Figure 6:
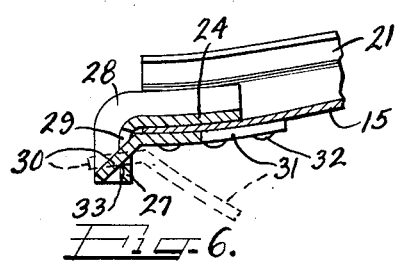
Figure 6 is a fragmentary sectional detail view taken substantially on the line VI—VI of Figure 4.

The invention has been illustrated as embodied in an assembly including a fender 15 having a wheel opening 16 which is ornamentally closed by a fender shield 17 which may be in the form of a sheet metal panel of appropriate size and form.

In the present instance, the fender shield 17 fits within the fender opening 16 in such a manner as to lie substantially flush with the outer surface of the fender 15 and for this purpose is formed about its fender-contacting edge with a substantially hook shaped inturned reinforcing flange 18 (Fig. 12) which is adapted to support a cushioning gasket 19 and is received within a rabbet groove 20 provided by a marginal fender flange structure 21 defining the fender opening 16 and affording reinforcement for the opening margin of the fender.

The opposite ends of the lower margin of the fender shield 17 and the cooperating adjacent lower marginal portions of the fender 15 are turned inwardly on a large radius substantially as shown in Figs. 2, 4, 5 and 6 and are provided with improved interengaging means for supporting the fender shield in the asembly. Herein such means comprises a bracket assembly 22 associated with one end of the fender shield 17 and the continguous margin of the fender 15 and a bracket structure 23 associated with the opposite end of the fender shield and the respective contiguous margin of the fender. Both of the hanger structures 22 and 23 are preferably of substantially similar construction and operation and are both characterized by the provision of a slotted hanger plate carried by the fender and interengageable by a hanger bracket arm having a portion received within the slotted hanger plate.

Having reference, now, to the hanger structure 22, (Figs. 4 and 6) it comprises a simple hanger plate 24 of substantial width secured as by spot welding 25 to the inturned margin of the fender 15 closely adjacent to the fender reinforcing flange 21. The inner margin of the hanger plate 24 extends beyond the fender and is turned down to provide a hanger flange 27. Side marginal turned up flanges 28 on the hanger plate 24 strongly reinforce the same.

Within the hanger flange 27 is a horizontal slot 29 arranged to receive a downwardly oblique retaining cam flange 30 on a hanger arm 31 secured as by means of rivets 32 to the under side of the lower margin of the fender shield 17 adjacent to and underlying the reinforcing flange 18 thereof. The bracket arm 31 extends endwise beyond the end of the fender shield 17 to a point where the retaining flange 30 freely registers with the hanger slot 29.

In assembly, the hanger arm flange 30 cammingly engages the lower edge defining the hanger slot 29 and identified at 33, thereby acting to draw the fender shield into close engagement with the fender. Furthermore, due to its downwardly oblique disposition, the flange 30 acts as a hook interengaging with the hanger bar edge 33 to retain the fender shield against outward displacement relative to the fender.

Another feature of the hanger arm flange 30 resides in its function as a rocking fulcrum for the fender shield 17 in the mounting and demounting of the fender shield. It will be observed in Fig. 6, that when the fender shield is to be mounted or removed, it must be swung down to a position where the hanger flange 30 clears the hanger bar slot edge 33, substantially shown in broken lines. Thus, in mounting the fender shield, it is held at an outwardly tilted position until the hanger arm flange 30 is inserted within the hanger slot 29 with the flange 30 resting on the slot edge 33. Then by swinging the fender shield 17 up toward the fender 15 the arm flange 30 cams inwardly on the edge 33, thus drawing the fender shield into snug engagement with the fender.

The hanger bracket structure 23 comprises a hanger plate 34 carried by the fender 15 and a hanger arm 35 carried by the fender shield 17.

The hanger plate 34 is of substantially the same construction as the hanger plate 24 previously described, and is secured to the inner surface of the fender 15 adjacent to the fender reinforcing flange 21 as by means of spot welding 37. The inner margin of the plate 24 projects beyond the edge of the fender shield lower margin and is formed with a depending hanger flange 38 formed with a horizontal hanger slot 39. Upstanding reinforcing flanges 40 are provided along the side margins of the hanger plate 34.

The hanger arm 35 is secured as by means of rivets 41 to the outer or under surface of the fender shield margin and extends endwise beyond the reinforcing flange 18 of the fender shield. The arm 36 has an inwardly and obliquely downwardly projecting flange 42 which registers with and interengages within the hanger arm slot 39, for cammingly and retainingly engaging the hanger bar provided by such flange along the lower edge of the hanger slot 39, in substantially the same manner and for the same purpose as the hanger arm flange 30 previously described.

As will be observed, the hanger arm flanges 30 and 42 are so disposed that in assembling the fender shield 17 with the fender, both of said flanges can be simultaneously projected through the respective hanger flange slots 29 and 39. Likewise release of the hanger flanges 30 and 42 is adapted to be effected by a single outward movement of the fender shield 17 upon being tilted down until the arm flanges release from the respective hanger plate flanges.

Figure 7:
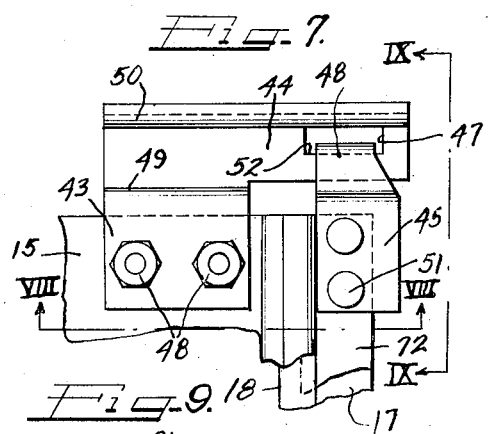
Figure 7 is a fragmentary top plan view showing a modified form of fender shield supporting and attaching means.
Figure 8:
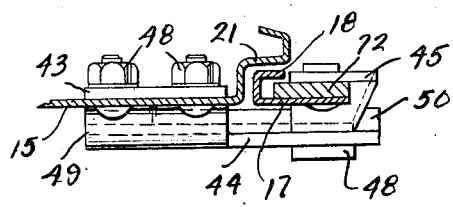
Figure 8 is a vertical sectional view taken substantially along the line VIII—VIII of Figure 7.
Figure 9:
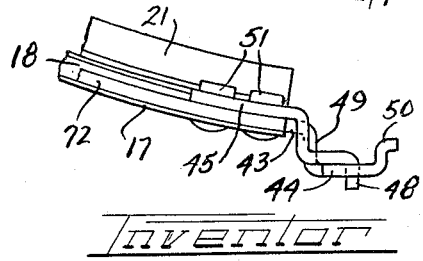
Figure 9 is a vertical sectional view taken substantially along the line IX—IX of Figure 7.

In the modified form of hanger structure shown in Figures 7 through 9 the fender carries a bracket plate 43 which is formed with a hanger arm 44 that extends laterally cantilever fashion into the wheel access opening in the fender into the path of a hook-like element in the form of an attachment arm or finger 45 carried by the fender shield 17, the arm 44 having a slot 47 within which a down turned flange 48 on the finger 45 extends.

The bracket plate 43 is secured to the upper or inner face at the lower under-turned margin of the fender 15 as by means of bolts 48 and beyond the edge of the fender is downwardly offset as at 49 so as to afford the necessary clearance for the top of the hanger arm 44 to accommodate the bracket finger 45 and in addition to afford substantial reinforcement to stiffen the bracket plate against bending under the weight of the fender shield imposed thereon through the finger 45. Further reinforcement for the bracket plate 43 and its finger arm 44 is provided by a reinforcing flange 50 formed along the inner edge thereof.

The bracket finger 45 is secured to the fender shield reinforcing flange 18 by means of rivets 51. The engagement flange 48 is obliquely inclined downwardly so as to enter into camming relation to the outer edge of the slot 47, identified at 52, whereby in assembly to draw the fender shield 17 into snug engagement with the fender.

In assembling or disassembling the fender shield 17 it can be easily and conveniently rocked about a fulcrum provided by the hanger bar provided at the outer side of the hanger arm 44 and including the finger engaged slot edge 52, for projecting the finger flange 48 into or removing it from the slot 47 as the case may be.

It will be understood, of course, that a similar hanger structure as shown in Figs. 7 to 9, inclusive, may be utilized at both ends of the fender shield, with appropriate modification of the hanger plate 43 and the finger 45 in order to accommodate the different locations.

In the further modified form of hanger structure as shown in Figures 10 and 11, a hanger plate 53 is carried by the fender 15 and is engaged by an arm 54 carried by the fender shield 17. The bracket plate 53 is secured as by means of spot welding 55 to the inner or upper face of the lower margin of the fender 15 and projects beyond the edge of the fender to provide a support for a lateral integral arm extension 57 on the arm 54. The arm extension 57 extends beyond the lower edge of the fender shield 17 and endwise therebeyond clear of the fender shield reinforcing flange 18 and the fender flange 21 to rest upon the bracket plate 53 with a downwardly extending interlock flange 58 on the arm extension projecting through a slot 59 in the bracket plate. The bracket arm 54 may be secured to the fender shield 17 as by means of rivets 60. An upstanding reinforcing flange 61 may be formed along the free edges of the arm 54 and the extension 57, and the latter may be formed with a reinforcing bead 62 whereby to rigidify the structure.

By preference, the relationship of the interlock flange 58 and the slot 59 to receive the same is such that in the fully assembled relationship of the fender shield and the fender, the flange 58 bearing against the edge of the slot nearest the fender, identified at 63, holds the fender shield in snug engagement with the fender.

In assembling the fender shield 17 with the fender 15, where the fender and fender shield are equipped with the supporting bracket structure including the bracket plate 53 and the bracket arm 54, the inner or lower margin of the fender shield is maneuvered to carry the arm extension 57 inwardly and over the bracket plate 53 until the interlock flange 58 registers with the slot 59. Thereupon, the flange 58 is projected into the slot 59 and the arm 57 comes to rest upon the bracket plate 53. Since the bracket arm extension 57 is relatively narrow, it will be readily apparent that the fender shield 17 can be rocked about a fulcrum provided by the bracket plate 53 into and out of full engagement with the fender 15.

In addition to the end-supporting bracket structures, the fender shield 17 is equipped with latching and clamping mechanism 65 (Figs. 2, 3, 12 and 13) which is preferably disposed substantially centrally at the rear thereof for engagement with the marginal flange structure defining the wheel opening 16 in the fender. In the present instance, such mechanism comprises a support member 67 and a latching and clamping member 68. The support member 67 is preferably a vertically elongated sheet metal plate having longitudinal side reinforcing flanges 69 and an angular foot flange 70 which is adapted to be secured as by means of rivets 71 to the top of a reinforcing bar 72 which is carried upon an inwardly angular reinforcing flange 73 along the lower edge of the fender shield 17. At its upper end, the supporting member 67 is disposed within the channel provided by the upper edge of the reinforcing flange 18 of the fender shield and behind the resilient gasket 19. In this way the support member also serves as a reinforcing strut for the fender shield.

By preference the latching and clamping member 68 comprises a cylindrical rod which is vertically reciprocably and rotatably slidably guided within a bearing ear 74 which is preferably struck out integrally from the supporting plate 67 and extends inwardly therefrom in a horizontal plane. The ear 74 has an eye aperture 75 therein defined by a downturned reinforcement and guide flange 77 within which the latching and clamping rod 68 is slidably bearinged. The upper end portion of the clamping and latching rod 68 is formed into an arcuate latching and clamping head 78 which is integrally joined to the main body of the latching and clamping rod by a right angular integral offsetting arm 79. The head 78 has a cam face 80 engageable in clamping and latching relation with an inwardly and upwardly turned marginal flange extension 81 on the marginal reinforcing flange 21 of the fender 15.

The relationship of the offsetting arm 79 and the clamping and latching head 78, as well as the bearing ear 74 is such that the latching and clamping rod 68 is adapted to be rotated to swing the head 78 into and out of latching and clamping relation to the flange section 81 substantially as shown in Figs. 12 and 13. In the disengaged position, the latching and clamping rod 68 is adapted to drop down until the arm 79 rests against the bearing ear 74 in which latter position the head 78 is at a low enough elevation entirely to clear the fender flange 21 and thereby permit the fender shield 17 to be swung clear of the fender.

In view of the fact that the end supporting bracket structures 22 and 23 are disposed substantially inwardly from the major plane of the fender shield 17 and afford a substantially horizontal attachment axis for the fender shield which is eccentrically inwardly disposed, there is, of course, a normal tendency for the fender shield to swing outwardly away from the fender 15. In order to avoid precipitate and uncontrolled swinging away of the fender shield in the initial release of the latching and clamping mechanism, the terminal end portion of the head 78 is formed with an interim retaining hook terminal 82 extending therefrom in generally the direction of the connecting arm 79. The hook terminal 82 is operative as the latching and clamping rod 68 is rotated to carry the head 78 away from the fender flange extension 81 to engage such flange and hold the fender shield 17 in a partially open position substantially as shown in Fig. 13. Then, in order to fully release the fender shield, it is swung substantially back towards the fender 15, as indicated in broken outline in Figure 13, until the interim hook terminal 82 clears the flange extension 81 and drops down with the latching and clamping rod to its inactive position, whereupon the fender shield can again be swung out conveniently for disengaging the bracket structures 22 and 23 and fully demounting the fender shield.

For manipulation of the latching and clamping rod 68, it is preferably provided with means such as a right angular handle extension 83 at its lower end and below the lower portion thereof which is bearinged in an appropriate bearing aperture 86 formed through the superimposed foot flange 70, reinforcing bar 72 and fender shield flange 73. The handle 83 extends in the opposite direction from the head 78.

In the present instance the handle 83 also serves as a latch for retaining the latching and clamping rod 68 in the latching and clamping position thereof. For this purpose, as best seen in Figs. 2 and 3, the handle 83 is formed of such length that its inherent resiliency permits it to be swung sufficiently for an open generally outwardly extending latching loop 84 formed therein adjacent to its free end to be engaged latchingly upon the reinforcing bar 72. A reverse loop in the terminal portion of the handle 83 facilitates manipulation thereof. The latching loop 84 holds the handle 83 in the latching position until it is released by swinging it inwardly and downwardly into the position indicated in broken outline in Fig. 2 where it will clear the lower fender shield flange 73 and can be swung outwardly to turn the latching and clamping rod 68 to the non-latching position, as shown in Fig. 13.

When the latching and clamping rod 68 is to be returned to the latching and clamping position, the handle 83 is manipulated upwardly to slide the rod 68 up into the latching and clamping position whereupon a turning of the handle in the appropriate direction will carry the cam surface 80 of the head 78 into the latching and clamping relation to the fender flange extension 81. Then springing of the handle 83 into the latching position of the latching loop 84 causes the latching and clamping rod 68 to be held firmly in the latching and clamping position thereof wherein the upper margin of the fender shield 17 is drawn firmly into the assembled engagement with the fender 15. At the same time the cooperative relationship of the end hanger brackets 22 and 23 assures that firm contiguity of the end margins of the fender shield and the fender results.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a fender and fender shield assembly, the fender having a wheel access opening and the fender shield being adapted to afford an ornamental closure for said opening, the lower marginal portions at the opposite ends of the fender shield and the contiguous marginal portions of the fender defining the ends of said opening being turned under and inwardly on a substantial radius, bracket plates carried by and projecting inwardly beyond said inwardly turned marginal portions of the fender closely adjacent to the wheel opening, the inwardly projecting portions of said plates having respective slots therein, and bracket arms carried by the inturned marginal portions of the fender shield and including flanges interengaging with said plates within said slots, said plates supporting said arms and thereby the fender shield.

2. In combination in a fender and fender shield assembly, the fender having a wheel access opening and the fender shield being adapted to afford an ornamental closure for said opening, the respective lower marginal portions at the opposite ends of the fender shield and the contiguous marginal portions of the fender defining the ends of said opening being turned under and inwardly on a substantial radius, bracket plates carried by said inwardly turned marginal portions of the fender closely adjacent to the wheel opening and having horizontally elongated slots therein, bracket arms carried by the inturned marginal portions of the fender shield and having respective generally flattened portions with their major dimension generally horizontal and interengaging within said slots, said plates supporting said arms and thereby the fender shield, and said arms being so disposed with respect to said slots that when operatively engaged within the slots the end margins of the fender shield are maintained in snug contiguity to the margins of the fender.

3. In combination in a fender and fender shield assembly, the fender having a wheel access opening and the fender shield being adapted to afford an ornamental closure for said opening, the lower marginal portion at the opposite ends of the fender shield and the contiguous marginal portions of the fender defining the ends of said opening being turned under and inwardly on a substantial radius, bracket plates carried by said inwardly turned marginal portions of the fender closely adjacent to the wheel opening and having horizontally elongated slots therein, hanger arms carried by the inturned marginal portions of the fender shield and having respective generally flattened portions with their major dimension generally horizontal and including flanges interengaging within said slots, said plates supporting said arms and thereby the fender shield, said plates being so disposed with respect to said bracket arms and said flanges providing cam surfaces so related to said slots that in operative assembly the flanges coact with the margins of the plates defining the slots to take up slack in the contiguous end margins of the fender shield and the opposing margins of the fender and draw the same tightly together.

4. In combination in a fender and fender shield assembly, the fender having a wheel access opening and the fender shield being adapted to afford an ornamental closure for said opening, the lower marginal portions at the opposite ends of the fender shield and the contiguous marginal portions of the fender defining the ends of said opening being turned under and inwardly on a substantial radius, substantially horizontally lying bracket plates carried by said inwardly turned marginal portions of the fender closely adjacent to the wheel opening and projecting inwardly beyond the respective edges of said marginal portions of the fender, the inwardly projecting portions of said plates having horizontally elongated slots therein, arms carried by the inturned marginal portions of the fender shield and having respective generally flattened portions with their major dimension generally horizontal and including flanges interengaging within said slots, said plates supporting said arms and thereby the fender shield, said plates being so disposed with respect to said bracket arms, and said flanges providing cam surfaces so related to said slots, that in assembly the flanges coact with the margins of the plates defining the slots to take up slack in the contiguous end marginal portions of the fender shield and the opposing marginal portions of the fender and draw the same tightly together, said flanges and said plates cooperating to provide a substantially horizontal fulcrum for swinging the fender shield into and out of engagement with the fender.

5. In combination in a bracket structure for a fender and fender shield assembly, a bracket plate having a body portion to be secured to the margin of a fender and an angular flange adapted to be disposed beyond the edge of the fender, said flange having a horizontally elongated slot therein defined at one side by a supporting bar portion, and an arm adapted to be carried by a fender shield and having a flange engageable in operative assembly within said slot and with a broad face of the flange opposing said bar portion.

6. In combination in a bracket structure for a fender and fender shield assembly, a bracket plate having a body portion to be secured to the margin of a fender and an angular flange adapted to be disposed beyond the edge of the fender, said flange having a horizontally elongated slot therein defined at one side by a supporting bar portion, and an arm comprising a body portion adapted to be carried by a fender shield and having a flange engageable in operative assembly within said slot, said flange extending divergently downwardly relative to the body portion of the arm and providing a cam surface acting against said bar portion to afford a slack takeup for drawing the fender shield toward the fender.

7. In combination in a bracket structure for a fender and fender shield assembly, a bracket plate having a flanged portion thereof adapted to extend beyond the edge of a fender to which it is attached and having a slot therein, and a generally flat sheet metal bracket arm having a body portion adapted to be secured in a generally horizontal plane to a fender shield and having a flange portion extending diagonally downwardly from the body portion and cammingly engageable within said slot.

8. In combination in a fender and fender shield bracket structure, a fender bracket plate adapted to be secured to the margin of the fender at one side of the wheel opening in the fender and having an extension adapted to extend beyond the fender and laterally into the wheel opening, said extension having a slot disposed on a generally horizontal axis therein, and a bracket arm adapted to be secured to a fender shield adjacent to the end extremity thereof and having a flanged structure thereon engageable within said slot and with a broad face engaging one edge defining the slot and in operative assembly acting to draw the bracket arm toward the extension and thus draw the fender shield into snug contiguity to the fender.

9. In combination in a hanger bracket structure for a fender and fender shield assembly, a bracket plate adapted to be secured to a fender and having a slot therein disposed on a horizontal axis, and a bracket arm adapted to be carried by a fender shield and having a lateral extension adapted to project beyond the end of the fender shield, said extension having a flange thereon adapted to enter said slot interlockingly and with a broad face of the flange opposing one edge defining said slot.

10. In combination in a fender and fender shield assembly wherein the fender has a wheel access opening and the fender shield is adapted to close said opening ornamentally, a hanger bracket structure for the end of the fender shield including a plate member secured to the fender adjacent to the opening and including a portion having a slot therein having its axis disposed horizontally, and an arm member carried by the fender shield and having a portion thereof formed with a flange adapted in assembly to enter said slot and having a broad face engaging one edge defining the slot, one of said portions comprising an extension projecting laterally across the joint between the fender and fender shield.

11. In combination in a fender and fender shield assembly wherein the fender has a wheel access opening and the fender shield is adapted to close said opening removably, the fender having an inturned flange defining the upper margin of the opening, means for pivotally securing the lower margin of the fender shield to the fender, and a clamping and latching rod mounted at the inner side of the fender shield and having a vertically extending body portion with a handle portion extending angularly from the lower end of the body portion and a clamping head extending from the upper end of the body portion in a direction opposite to the handle portion, said clamping head having a hook terminal extending in the same direction as the handle, said hook terminal affording an interim engagement element interengageable with said flange on the fender when the handle is turned outwardly.

12. In combination in a fender and fender shield assembly wherein the fender has a wheel access opening and the fender shield comprises a panel structure adapted to afford an ornamental closure for said opening, respective fender shield supporting brackets secured to the lower extremity of the fender adjacent to the respective opposite ends of the fender opening and each of said brackets having a depending flange extending below the adjacent margin of the fender and including in each instance a horizontal slot, and respective similar engagement arms secured to the lower extremities at the respective opposite ends of the fender shield and extending endwise beyond the fender shield across the joint between the fender and fender shield, each of said arms having an interengagement finger flange engaging within the horizontal slot of the respective companion fender shield supporting bracket on the fender.

13. In combination in a fender and fender shield assembly wherein the fender has a wheel access opening and the fender shield comprises a panel structure closing said opening, a fender shield supporting bracket for the lower part of the fender shield comprising a bracket body secured to the lower extremity of the fender adjacent to an end of the wheel access opening and projecting inwardly from the supporting fender extremity, said bracket body including a lateral extension portion extending laterally from its inner extremity across the joint between the fender and the fender shield, said extension portion being formed adjacent to its extremity remote from the body of the bracket with an aperture, and an engagement finger bracket secured to the lower margin of the fender shield adjacent to the extremity thereof nearest said fender shield supporting bracket and including an extremity portion retainingly engaging in said aperture in the fender bracket extension.

14. In combination in a fender and fender shield assembly, a fender having a wheel access opening, a fender shield closing said opening, said fender having at the lower margin thereof adjacent to one end of the wheel access opening a bracket for supporting the fender shield and including a portion projecting inwardly beyond the end of the fender shield adjacent to but entirely on the fender side of the joint between the fender and fender shield, said portion having an aperture therein, and an interengaging bracket member secured to the fender shield at its lower marginal extremity adjacent to the end nearest said supporting bracket on the fender, said fender shield bracket having a lateral extension projecting across and beyond the joint between the fender and fender shield and engaging in said aperture of said fender bracket for retaining the fender shield in place on the fender.

15. In combination in a fender and fender shield supporting assembly, a supporting bracket structure comprising a plate having a slot therein disposed on a generally horizontal axis, and an arm including a flange engageable within said slot broadside to one side edge defining the slot, said plate including a generally horizontally disposed body portion adapted to be secured fixedly to the lower margin of a fender and a flange portion to extend beyond said lower margin of the fender, and the arm being adapted to be secured fixedly in position on the lower corner portion of a fender shield for entry of the flange into said slot by movement of the fender shield toward assembled relation to the fender, said arm being rockably cooperable with the supporting bracket plate.

16. In a fender shield supporting assembly, a generally L-shaped metal bracket member having a body portion adapted to be secured fixedly to a fender adjacent the lower corner thereof at the wheel access opening in the fender and with the remaining portion of the bracket extending in a direction across the edge of the fender opening and generally into said opening, said remaining portion having adjacent to its extremity remote from the body portion an aperture extending on a generally horizontal axis, and a metal retaining finger bracket member having a body portion arranged to be fixedly secured to the lower margin of a fender shield adjacent to its end which in assembly will be disposed adjacent to said L-shaped bracket and a portion arranged to project beyond the adjacent margin of the fender shield and having a broad face bearing in retaining engagement with said remaining portion of said bracket, said projecting portion including an angular flange extending into said aperture.

17. In combination in means for supporting a fender shield on a fender, a bracket member adapted to be secured fixedly to the margin of a fender adjacent to the lower extremity at the wheel access opening of the fender and with a portion of the bracket extending beyond the supporting margin of the fender, said latter portion having an elongated aperture therein extending on a generally horizontal axis, and a generally L-shaped flat retaining finger bracket having a body portion adapted to be secured in a substantially horizontal plane fixedly to the lower extremity of a fender shield and a laterally extending engagement finger portion adapted to extend endwise beyond the end of the fender shield and having an inwardly and downwardly projecting broad flange portion extending into retaining engagement with said bracket and into the aperture thereof with a broad surface of the flange opposing an edge defining said aperture, for supporting the fender shield in place.

18. In combination in a fender and fender shield assembly, a fender having a wheel access opening, a fender shield closing said wheel access opening, the opposite lower end portions of the fender defining the wheel access opening and the corresponding end portions of the fender shield having interconnecting and supporting means for initial assembly of the fender shield with the fender and rocking of the fender shield into closing relation to the fender, and means for finally clamping the fender shield in place on the fender, said end interconnecting and supporting means each comprising a bracket plate including a generally horizontally lying body secured to the lower extremity of the fender and projecting inwardly beyond said lower extremity, the inner extremity portion of the fender carried bracket plate being provided with an elongated aperture extending on a generally horizontal axis, the fender shield component of the end supporting means comprising a generally flat sheet metal finger secured to the fender shield and projecting inwardly therefrom and having a downturned flange portion engaging within said aperture and opposing an edge defining said aperture broadside whereby to effect interengagement of the bracket and finger in a manner to retain the lower portion of the fender shield in assembly with the fender.

19. In combination in a fender and fender shield assembly, the fender having a wheel access opening closed by the fender shield, a flange on the bottom of the fender and extending inwardly, a bracket secured to and supported by the fender flange at one side of the wheel access opening and having a cantilever arm portion projecting beyond said margin of the fender into the wheel access opening, said cantilever arm portion having an aperture therein accessible through said wheel access opening of the fender, the fender shield having a bracket member thereon including a generally hook-like element projecting inwardly and engaging in said aperture to support the fender shield on the bracket.

GEORGE W. SCHATZMAN.

REFERENCES CITED

The following references are of record in the file of this patent:

UNITED STATES PATENTS

| Number | Name | Date |
|---|---|---|
| 1,411,784 | Hipolito | Apr. 4, 1922 |
| 1,605,458 | Neeb | Nov. 2, 1926 |
| 1,631,508 | Wagner | June 7, 1927 |
| 2,068,732 | Cadwallader | Jan. 26, 1937 |
| 2,178,363 | Schatzman | Oct. 31, 1939 |
| 2,238,948 | Schatzman | Apr. 22, 1941 |
| 2,239,373 | Schatzman et al. | Apr. 22, 1941 |
| 2,263,946 | Fletcher | Nov. 25, 1941 |
| 2,273,523 | Landus | Feb. 17, 1942 |
| 2,312,536 | Fergueson | Mar. 2, 1943 |
| 2,334,867 | Fergueson | Nov. 23, 1943 |
| 2,349,466 | Schueren | May 23, 1944 |